(12) United States Patent
McElvain

(10) Patent No.: US 7,271,934 B2
(45) Date of Patent: Sep. 18, 2007

(54) METHOD FOR SMOOTH TRAP SUPPRESSION OF SMALL GRAPHICAL OBJECTS USING RUN LENGTH ENCODED DATA

(75) Inventor: Jon S. McElvain, Redondo Beach, CA (US)

(73) Assignee: Xerox Corporation, Stamford, CT (US)

( * ) Notice: Subject to any disclaimer, the term of this patent is extended or adjusted under 35 U.S.C. 154(b) by 986 days.

(21) Appl. No.: 10/411,562

(22) Filed: Apr. 10, 2003

(65) Prior Publication Data

US 2004/0201865 A1    Oct. 14, 2004

(51) Int. Cl.
*H04N 1/56* (2006.01)
*H04N 1/58* (2006.01)

(52) U.S. Cl. .................... 358/1.9; 358/3.26; 358/539; 382/245

(58) Field of Classification Search ................ 358/1.1, 358/1.9, 3.26, 443, 448, 462, 518, 521, 525, 358/539; 382/162, 164, 165, 166, 245
See application file for complete search history.

(56) References Cited

U.S. PATENT DOCUMENTS

| | | | | |
|---|---|---|---|---|
| 5,687,303 | A | 11/1997 | Motamed et al. | 395/117 |
| 5,923,821 | A * | 7/1999 | Birnbaum et al. | 358/1.9 |
| 6,006,013 | A | 12/1999 | Rumph et al. | 395/114 |
| 6,256,104 | B1 | 7/2001 | Rumph et al. | 358/1.15 |
| 6,327,043 | B1 | 12/2001 | Rumph et al. | 358/1.15 |
| 6,341,020 | B1 * | 1/2002 | Rumph et al. | 358/1.9 |
| 6,345,117 | B2 | 2/2002 | Klassen | 382/167 |
| 6,377,711 | B1 * | 4/2002 | Morgana | 382/274 |
| 6,549,303 | B1 * | 4/2003 | Trask | 358/1.9 |
| 6,738,159 | B2 * | 5/2004 | Harrington | 358/1.9 |
| 6,757,072 | B1 * | 6/2004 | McElvain | 358/1.15 |
| 6,781,720 | B1 * | 8/2004 | Klassen | 358/3.27 |
| 6,795,214 | B2 * | 9/2004 | Weinholz et al. | 358/1.9 |
| 6,844,942 | B2 * | 1/2005 | Rumph et al. | 358/1.9 |
| 6,970,271 | B1 * | 11/2005 | Estrada et al. | 358/1.9 |
| 7,009,735 | B2 * | 3/2006 | Ebner | 358/1.9 |
| 7,123,381 | B2 * | 10/2006 | Klassen | 358/1.9 |
| 2001/0033686 | A1 * | 10/2001 | Klassen | 382/167 |
| 2002/0024679 | A1 * | 2/2002 | Hauck | 358/1.9 |
| 2003/0011796 | A1 * | 1/2003 | Kohn | 358/1.9 |
| 2003/0044065 | A1 * | 3/2003 | Harrington | 382/167 |

OTHER PUBLICATIONS

U.S. Appl. No. 09/538,596, filed Mar. 29, 2000, Jon S. McElvain.
U.S. Appl. No. 10/263,534, filed Oct. 2, 2002, David E. Rumph et al.

* cited by examiner

*Primary Examiner*—Thomas D. Lee
(74) *Attorney, Agent, or Firm*—Jeannette M Walsh

(57) ABSTRACT

A method for smooth trapping of an object containing run length encoded image pixel data, includes collecting a number of scanlines of run length encoded pixel data equal to 2M in a buffer, wherein M is a line width trap threshold; determining those runs within the collected scanlines that require trapping, wherein a run is a portion of a scanline; if trapping is required in the fast scan direction and the length of the run requiring trapping is less than M, reducing the width of the trap region by a prorated percent. If trapping is required in the slow scan direction, and the number of runs above and below the run to be trapped is less than M, reducing the number of runs above and below the run to be trapped by a prorated percentage.

7 Claims, 3 Drawing Sheets

METHOD FOR SMOOTH TRAP SUPPRESSION OF SMALL GRAPHICAL OBJECTS USING RUN LENGTH ENCODED DATA

CROSS REFERENCE TO RELATED APPLICATIONS

This invention is related to co-pending, co-assigned application Ser. No. 10/263,534 for "Method for Trapping Raster Data in a Run-Length Encoded Form" filed Oct. 2, 2002, and to co-pending, co-assigned application Ser. No. 09/538,596 filed Mar. 29, 2000, for "Method for Trapping Suppression for Thin Graphical Objects Using Run Length Encoded Data," the contents of both are incorporated herein by reference and made a part of this application. This invention is also related to the inventor's application for "Method for Smooth Trap Suppression of Small Graphical Objects" which has been assigned to the assignee of this invention and which has been filed the same date as this application.

FIELD OF THE INVENTION

This invention relates generally to methods for correcting for marking engine characteristics, and more particularly, to a method for smooth trap suppression of small graphical objects using run length encoded data.

BACKGROUND OF THE INVENTION

Electronic processing of graphic and text images produces multi-color prints using multiple color separations. Typically, four process colors, cyan, magenta, yellow and black, are used to print multiple separations, which tend to have minor misregistration problems. The result of abutting or overlapping shapes is a boundary between adjacent regions of color that, under ideal printing conditions should have zero width. That is, one color should stop exactly where the abutting color begins, with no new colors being introduced along the boundary by the printing process itself. In practice, the realization of a zero width boundary between regions of different color is impossible as a result of small but visible misregistration problems from one printed separation to another. The error is manifested as a "light leak" or as a visible boundary region of an undesired color.

Methods for correcting for this misregistration are known. The general approach is to expand one of the abutting regions' separations to fill the gap or misregistration border region with a color determined to minimize the visual effect when printed. Borders or edges expanded from a region of one color to another in this manner are said to be "spread". A border which has been expanded is referred to as a "trap", and the zone within which color is added is called the "trap zone".

Trapping is a generally a two step process. The first step in the trapping process is to determine where there is an edge on which to apply trapping. Trapping is typically used between pixels that are not of identical color, but it can be used in other locations as well. The second step is to generate the overlay of one or more pixels, in any combination of the color separations, which is done by a trap generator or trap oracle. The two inputs for the trap generator are the colors on both sides of the edge in question. For example, consider magenta and cyan, with a user-specified maximum trap width of two. The generator will compute from these whether trapping is necessary, what color to use, and where it should be applied. In this example, the correction could be zero (no trapping), one, or two pixels in width in any combination of cyan, magenta, yellow and black, and it could be located in either the magenta or cyan area. Edge detection and image manipulation to perform trapping may be done in any of several processes, including for example, the technique described in U.S. Pat. No. 6,345,117 to Victor Klassen, for "Method for Automatic Trap Selection for Correcting for Separation Misregistration in Color Printing".

For the typical trapping operation, it is assumed that objects to be trapped are very large relative to the trapping region, so that the trap colors will be difficult to distinguish. Thus, the color of only a thin boundary of the object will be changed, while the large internal area will have the original, correct color. However, for objects smaller than a few pixels, or for long, thin objects having a width less than a few pixels, trapping results in visible hue changes in the color of the entire object. For example, if a thin line is only two pixels in width, and the trap generator decides to change the color of those two pixels, the entire color of the thin line has been changed. Small objects, such as small font size text characters, may be printed in an entirely different color. If the thin line, or the small object, happens to be located near a larger object of the same initial color, there will be a visible hue shift relative to the larger object, and the result of the trapping operation will be less desirable than no trapping at all.

Run length encoding is a type of lossless compression which utilizes the fact that many files frequently contain the same character repeated many times in a row. For example, text files use multiple spaces to separate sentences, indent paragraphs, format tables and charts, etc. Digitized signals can also have runs of the same value, indicating that the signal is not changing. For example, in a data sequence having frequent runs of zeros, each time a zero is encountered in the input data, two values are written to the output file. The first of these is a zero, a flag to indicate that run length compression is beginning. The second is the number of zeros in the run. If the average run length is longer than two, compression will take place. Many different run length encoding schemes have been developed.

Co-assigned application Ser. No. 09/538,596 filed Mar. 29, 2000, for "Method for Trapping Suppression for Thin Graphical Objects Using Run Length Encoded Data", (D/A0062) describes a technique for suppressing trapping for the boundary between two color areas where one is a thin line by testing the number of pixels which make up the thickness of the areas, the decision being based on run length encoded image data. The method of D/A0062 disables trapping for objects with a dimension smaller than a threshold value. Although this reduces the hue shift for "regular" rectangular objects, irregular trapping occurs at the edges of small and complex graphical objects (where local dimensions may be near or below the threshold), for example, small text or thin triangles. It is therefore desirable to reduce the hue shift for these small objects while preserving the continuity of traps along the edges.

SUMMARY OF THE INVENTION

The method of the invention can be used to reduce hue shifts in thin objects and small objects caused by trapping suppression in trap generators. A method for smooth trapping of an object containing run length encoded image pixel data, according to one aspect of the invention, includes collecting a number of scanlines of run length encoded pixel data equal to 2M in a buffer, wherein M is a line width trap threshold; determining those runs within the collected scanlines that require trapping, wherein a run is a portion of a scanline; determining if a run requiring trapping is located in a fast scan direction or a slow scan direction; if trapping is required in the fast scan direction, determining the length of the run requiring trapping; if the length of the run requiring trapping is less than M, reducing the width of the trap region according to a predetermined relationship; and applying a trap correction to the trap pixel according to the reduced trap region width. If trapping is required in the slow scan direction, the method further includes determining the number of runs above and below the run to be trapped that possess the same color as the run to be trapped; and if the number of runs above and below the run to be trapped is less than M, reducing the number of runs above and below the run to be trapped according to a predetermined relationship.

The predetermined relationship may include reducing the number of pixels to trap by a prorated percent (in the fast scan direction) and reducing the number of runs to trap by a prorated percent (in the slow scan direction). The predetermined relationship may include reducing the trap region width monotonically. In accordance with another aspect of the invention, the predetermined relationship may be of the form $t'=t_o f(w_t, w)$ for $w<wt$, and $t'=to$ when $w \geq wt$, where w is the width of the object, $w_t$ is the trap threshold width, $t_o$ is an original trap region width as determined by a trap generator and t' is the reduced trap region width. In accordance with another aspect of the invention, the predetermined relationship may be of the form $f(wt, w)=to(w/wt)$. A different predetermined relationship may be used for the fast scan direction than is used for the slow scan direction.

The result is a method for efficient suppression of trapping of thin objects, and an overall improvement of image quality, due to the facile nature of image data processing associated with the run length encoded format.

A method for smooth trapping of a thin graphical object, according to another aspect of the invention, includes receiving from a trap generator the location of a trap pixel in a thin object that should be changed in color; wherein a thin graphical object has a width dimension which is substantially less than the object's length dimension, determining the width of the thin object containing the trap pixel; comparing the width of the thin object with a trap threshold width; if the width of the thin object is less than the trap threshold width, reducing the width of the trap region according to a predetermined relationship; and applying a trap correction to the trap pixel according to the reduced trap region width.

In one embodiment, the predetermined relationship may be a relationship which reduces the trap width monotonically. Instead of completely eliminating trapping for dimensions below a threshold, the method of the invention reduces the trap distance in a monotonic fashion (as the object size is reduced). As a result, the hue shift will be reduced, while preserving some degree of trapping at the edges to reduce visible misregistration errors.

In another embodiment, the predetermined relationship may be of the form
$t'=t_o f(w_t, w)$ for $w<wt$, and $t'=to$ when $w \geq wt$, where w is the width of the object, $w_t$ is the trap threshold width, $t_o$ is an original trap width as determined by the trap generator, t' is the reduced trap width. In another embodiment, the function may be a linear relationship of the type $f(wt, w)=to(w/wt)$.

In accordance with another aspect of the invention, the method for smooth trapping may be applied to uniformly small objects, i.e., objects in which both dimensions (length and width) are less than the trap width threshold of a trap generator. A method for smooth trapping of a small object, includes receiving from a trap generator the location of a trap pixel in the small object that should be changed in color; wherein a small object has a size of the order of a few pixels; determining a dimension of the small object containing the trap pixel; comparing the dimension of the small object with a trap threshold width; if the dimension of the object is less than the trap threshold width, reducing the width of the trap region according to a predetermined relationship; and applying a trap correction uniformly to the small object according to the reduced trap width.

An example of a small object includes small font size text objects. In accordance with another aspect of the invention, the method for smooth trapping may be used to provide smooth trapping for text objects. A text object is generally described by its font size. The method includes receiving from a trap generator the location of a trap pixel in the text object that should be changed in color; determining the font size of the text object containing the trap pixel; comparing the font size of the object with a font size threshold; if the font size of the object is less than the font size threshold, reducing the width of the trap region according to a predetermined relationship; and applying a trap correction uniformly to the text object according to the reduced trap width. The same predetermined relationships used with respect to thin objects may also be used with small objects and text objects.

DETAILED DESCRIPTION OF THE PREFERRED EMBODIMENTS

Figure 1:
FIG. 1 illustrates hue shift at the edges of a thin object compared to a thicker object.

A thin graphical object is generally one in which the width is substantially less than its length (as can be seen, for example, in the thin line of FIG. 1). Assuming that a particular trap generator has a predetermined trap width threshold (below which trapping is disabled), the method of the invention determines the width of the object for which trapping is selected. If the width of the object is less than the trap width threshold of the trap generator, the method of the invention determines a trap width correction. The trap correction reduces the trap width according to a predetermined relationship. Trap pixels are then applied to the reduced trap area.

A method for smooth trap suppression for thin graphical objects according to one feature of the invention assumes run-length encoded form of raster data. In the discussion following, it is assumed that the runs are of constant color, where all the pixels of a given run have the same color. It is possible, however, to apply the method of the invention to runs that have sampled color, wherein each pixel of the run has a different color, as specified by a referenced pixel map.

McElvain et al. (U.S. patent application Ser. No. 10/263, 534 filed Oct. 2, 2002) describes a method for trapping data in a run length encoded form. This method requires a user specification of the maximum trap radius; i.e. the maximum number of pixels over which the trap zone will extend. The method employs a "scanline buffer" that has twice the number of scan lines as the trap radius specified. Each scanline of the image consists of a string of "runs", which are specified by a minimum position in the fast (horizontal) direction, a length (number of pixels), a color (if it is constant color), and other tags used for printing purposes. The runs can be of constant color, or derived from sampled image data. For example, if the trap radius is specified as two, 2M=4 scanlines at a time will be examined during the trapping procedure. In this method, the runs of all 2M scanlines are inspected, and the point where any run ends on a particular scanline is assumed to be an edge (denoted a "segment boundary").

Figure 2:
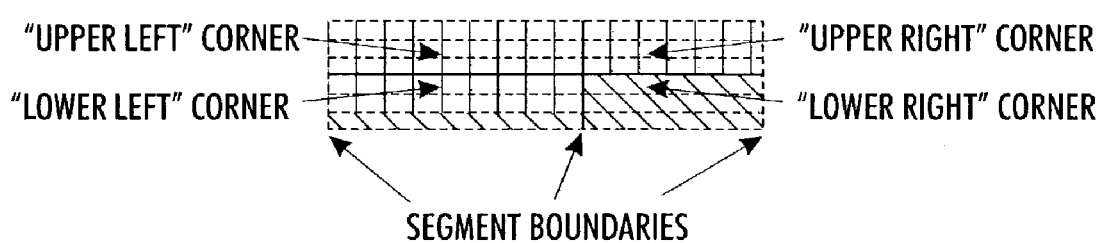
FIG. 2 is a region of interest for trapping runs, with intersections and four relevant corner run segments.
Figure 3:
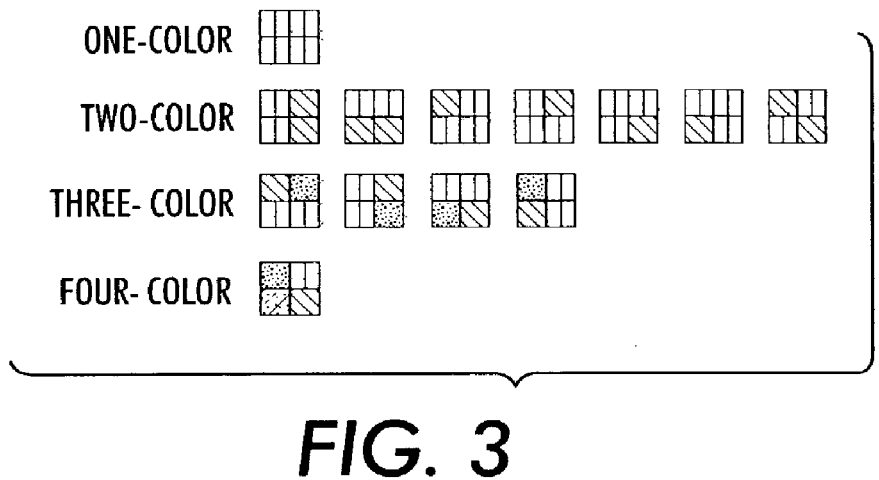
FIG. 3 shows the 13 possible corner geometries.

In order to determine what traps are needed on the fast- and slow-scan edges, and adjacent corners, the four colors adjacent to the center "crosshairs" of the buffer at each segment boundary are inspected. The center intersection is formed by the segment boundary in the fast-scan direction between the two segments, and the scanline boundary between the center two scanlines of the buffer. There are four segments adjacent to these crosshairs, referred to as "upper left", "upper right", "lower left" and "lower right" corners. FIG. 2 shows a region of interest for trapping runs, with the central intersection and four relevant corner run segments. More than one of these may have the same color. In order to determine where traps, if any, need to be placed, the four corners are compared, yielding one of 13 possible geometries. FIG. 3 shows all of the possible geometries for the segment boundary inspection procedure. The geometry determines where traps might be needed, directing the software to specific code that handles each geometry case. In each of these thirteen cases, the colors are used as inputs to the trapping generator, and depending on the output of the trapping generator, the colors of all four runs within the crosshairs may be modified. Once all segment boundaries within the scanline buffer are processed, the topmost scanline is output (to the printer, for example), and a new scanline is read into the bottom of the buffer. The trapping procedure is then repeated for this new set of scanlines within the buffer, until the entire image is processed.

A thin line discrimination process for use in trapping as described in McElvain (U.S. application Ser. No. 09/538, 596 filed Mar. 29, 2000, for "Method for Trapping Suppression for Thin Graphical Objects Using Run Length Encoded Data") includes: 1) Collecting in a buffer a number of scanlines of run length encoded image data equal to twice the minimum line width threshold (M). For an example, assume a threshold of two pixels (M=2), so the number collected of scanlines in the buffer would be four; 2) Determining the next "center" point that may require trapping, the point being the intersection of a vertical and horizontal line. The horizontal line is always in the center of the scan lines. Thus, in the case of four lines in the buffer, the horizontal line will have two lines above and two below. The vertical line will be through the next point at which any of the four scan lines exhibits a run (color) boundary (denoted a "segment boundary"). The colors of the pixels surrounding the point of intersection (upper left, upper right, lower left, lower right) are sent to the trapping generator and the color changes that should be made are received back; 3) If trapping is required in the fast scan direction, do so only if the length of the run in the fast scan direction is greater than M. That is, in the example, the trapping color change should be made only if the pixel to be changed is in a run of M or more pixels; 4) If trapping of a run is required in the slow scan direction, do so only if there are M runs above or below of the same color; 5) Repeat this sequence to find the next center point, from step 2; and 6) At the end of the scan, output the topmost scan line in the buffer for printing (or further image processing), and roll the remaining scanlines up one line (e.g., scanline 2 becomes 1, 3 becomes 2, and 4 becomes 3). A new scanline of image data is then added at the bottom, and the process is repeated from step 2.

The method for smooth trapping of an object containing run length encoded data uses the above described thin line discrimination method for trapping run length encoded data such that the trapping zone is reduced, rather than eliminated. The method includes: 1) collecting a number of scanlines equal to twice the line width threshold (denoted M) in a buffer; 2) determining those runs that require trapping; 3) if trapping is required in the fast scan direction, trapping in a normal fashion if the length of the run in the fast scan direction is greater than M—otherwise reducing the number of pixels to trap by a predetermined relationship (such as prorated percent); and 4) if trapping of a run is required in the slow scan direction, trapping in a normal fashion if at least M runs directly above or below possess the same color as the run to be trapped—otherwise reducing the number of runs (above or below) to be trapped by a predetermined relationship (such as a prorated percent). The result is a method for suppression of small object trapping hue shifts, and a preservation of trap continuity.

Figure 4:
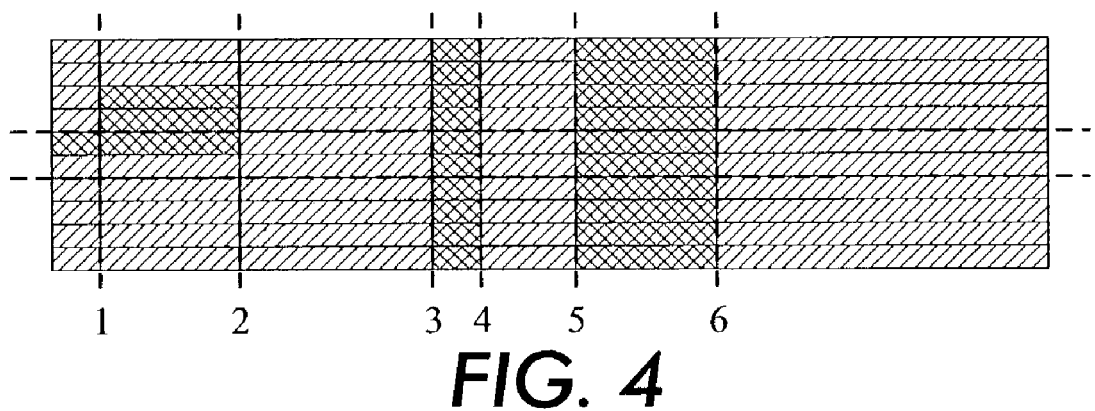
FIG. 4 shows an example scanline buffer configuration with 6 scanlines collected (M=3)

An example of a trap suppression problem using run length encoded data is shown in FIG. 4. 2M scanlines worth of run data are collected in a buffer, where M is the minimum line width above which normal trapping is to be performed. In FIG. 4 M=5 (10 scanlines collected). As with the thin line discrimination method described above, segment boundaries (i.e., the fast scan positions where run boundaries occur) are located within the buffer; these are labeled 1-6 in FIG. 4. The method inspects the runs of the middle two scanlines (designated by the horizontal dashed lines in FIG. 4) that intersect at each segment boundary. A total of 4 runs will therefore be considered (upper left, upper right, lower left, and lower right) at each segment boundary. The trap generator is then called if two or more abutting runs have a different color. Based on the run configuration at this intersection (the color "geometry") the implementation will determine whether to trap in the fast scan direction, the slow scan direction, or both.

If trapping of a run in the fast scan direction is deemed necessary (by the trap generator), the proposed enhancement will first inspect the length of the run. If the length of the run is greater than M, then trapping will be performed as requested. However, if the run length is less than M, the implementation will trap, but with a reduced trap width. The amount of reduction of the trap width is determined by a predetermined relationship. In this example, the amount by which the trap width is reduced is a function of the trap width and the threshold, according to the relationship $w'=w_o f(w_t, w)$, where w is the length of the run, w' and $w_o$ are the corrected and the original trap widths, respectively, and $w_t$ is the small object threshold. The weight function $f$ is unity above the threshold, and an increasing function below the threshold. An example weighting function $f$ is shown below in FIG. 5.

An example of a situation where such fast-scan discrimination would be applied can be found in FIG. 4. The dark (red) runs located between boundaries 4 and 5 are of length 4 pixels (less than M=5). If the trap generator specifies to trap into the red 2 pixels, the smooth trapping discriminator may only trap 1 pixel, according to the relationship shown in FIG. 5. However, the red runs located beyond boundary 6 are greater in length than M, so they will be modified according to the specification of the trap generator.

If trapping of a run in the slow scan direction is required, the procedure is more difficult. In this case, it is necessary to inspect the runs immediately above or below the run in question for comparison of colors. If it is found that the color (or a color that is close) extends above or below at least M scanlines, then trapping will be performed as specified by the trap generator. Otherwise the trapping distance specified by the trap generator will be reduced by an amount according to the weighting function (shown in FIG. 5). A good example of regions where this discrimination would be applied can be found in FIG. 4. Considering the region between the segment boundaries 1 and 2, assume trapping of the cyan (light) run is requested (as a result of the red/cyan interface in the slow scan direction) in the slow scan direction. Because the cyan run does not extend at least 5 pixels in the slow scan direction, the trapping distance (the number of runs above) will be reduced in a fashion consistent with FIG. 5. The result of this "smooth" thin object trapping discrimination is a significant reduction of small object hue shifts, as well as a preservation of trapping continuity at object edges.

Figure 5:
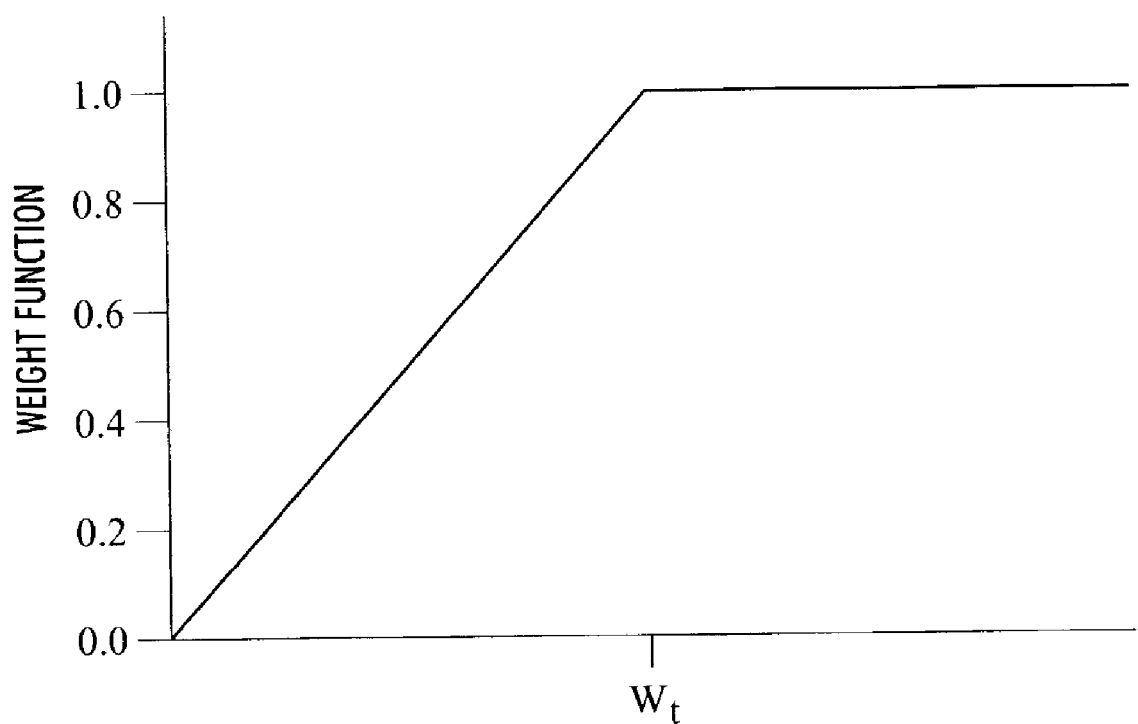
FIG. 5 is a graph of an exemplary weighting function for determining trap size.

Various predetermined relationships may be used. The predetermined relationship may be a monotonically increasing function of the object size, and is dependent on the threshold itself. For example, a function of the type may be used:

$$t' = t_o f(w_t, w)$$

for $w < wt$ and $t' = to$ when $w \geq wt$, where w is the width of the object, t' is the reduced trap width, $t_o$ is the original trap width as determined by the trap generator, and $w_t$ is the threshold width as determined by the trap generator. Weighting function $f$ is generally unity above the threshold, and an increasing function below the threshold (as w increases). An example weighting function $f$ that is monotonically increasing up to the threshold, and unity thereafter is shown in FIG. 5. The weighting function in FIG. 5 can be a linear function of the form f(wt, w)=to(w/wt).

Other weighting functions may also be applied. For example, a quadratic function which increases as w approached wt may be used. Higher order, monotonically increasing functions may also be used. Any function which meets the requirements of monotonically increasing with object size and f=1 when the object dimensions are greater than or equal to the threshold width determined by the trap generator may be used.

The method for smooth trapping may be applied to small objects, i.e., objects in which both dimensions (length and width) are less than the trap threshold width of a trap generator (or objects of only a few pixels). A dimension of the small object is determined and compared with the trap threshold width. If the object's dimension is less than the trap threshold width, a predetermined relationship (such as one of those described above with respect to thin objects) is used to reduce the trap region. Then trapping is applied uniformly to the entire small object using the reduced trap width.

The method of the invention can be used for font size discrimination, where the reduced trap width would be applied uniformly to the font. Text objects are generally defined the their font size. If a text character is one color and it is positioned on top of a different colored background (or plain paper), misregistration errors may appear as a shadowing effect. For very small font sizes, many trap generator would simply turn off the trap process. The method of the invention can be applied to reduce the trap width based on a predetermined relationship and apply the trap pixels uniformly to the text characters.

The result of this "smooth" thin (and small) object trapping discrimination is a significant reduction of small object hue shifts, as well as a preservation of trapping continuity at object edges. For example, for a trap generator with a trap threshold of 10 pixels (wt) and a trap radius of 3 pixels (to), an object of width 7 pixels (w) might have a corrected trap radius of 2 pixels (t').

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for smooth trapping of an object containing run length encoded image pixel data, comprising:
   collecting a number of scanlines of run length encoded pixel data equal to 2M in a buffer, wherein M is a line width trap threshold;
   determining those runs within the collected scanlines that require trapping, wherein a run is a portion of a scanline;
   determining if a run requiring trapping is located in a fast scan direction or a slow scan direction;
   if trapping is required in the fast scan direction, determining the length of the run requiring trapping;
   if the length of the run requiring trapping is less than M, reducing the width of the trap region according to a predetermined relationship; and
   applying a trap correction to the trap pixel according to the reduced trap region width.

2. The method of claim 1, wherein the predetermined relationship reduces the number of pixels to trap by a prorated percent.

3. The method of claim 1, further comprising:
   if trapping is required in the slow scan direction, determining the number of runs above and below the run to be trapped that possess the same color as the ran to be trapped;
   if the number of runs above and below the run to be trapped is less than M, reducing the number of runs above and below the run to be trapped according to a predetermined relationship.

4. The method of claim 3, wherein the predetermined relationship reduces the number of runs to trap by a prorated percent.

5. The method of claim 1, wherein the predetermined relationship comprises a relationship which reduces the trap region width monotonically.

6. The method of claim 1, wherein the predetermined relationship comprises:

$$t' = t_o f(w_t, w) \text{ for } w < w_t, \text{ and } t' = t_o \text{ when } w \geq w_t,$$

where w is the width of the object, $w_t$ is the trap threshold width, $t_o$ is an original trap region width as determined by a trap generator and t' is the reduced trap region width.

7. The method of claim 6, wherein $f(w_t, w) = t_o(w/w_t)$.

* * * * *